No. 762,673. PATENTED JUNE 14, 1904.
G. ARNOLD.
GAGE.
APPLICATION FILED OCT. 12, 1903.
NO MODEL.
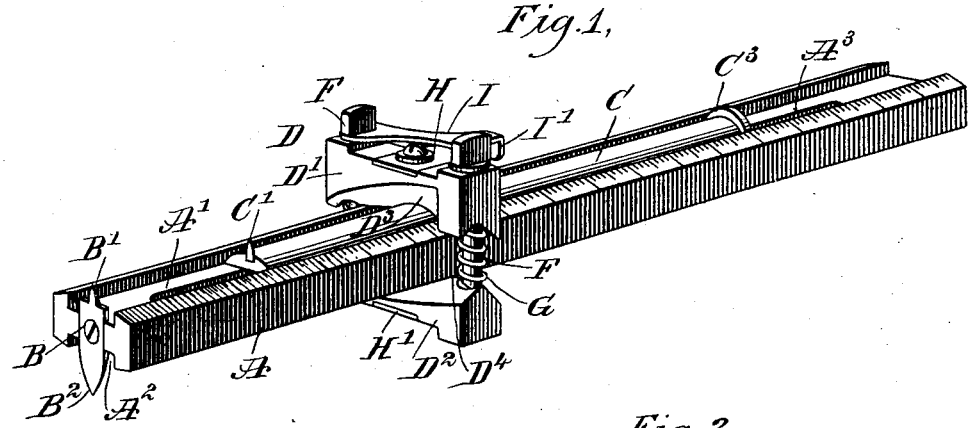
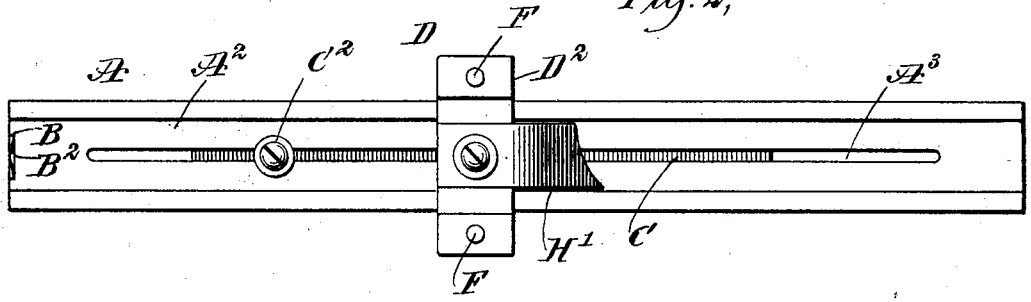
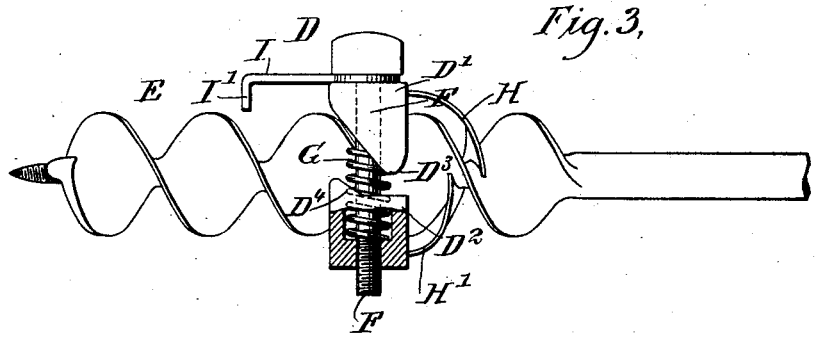
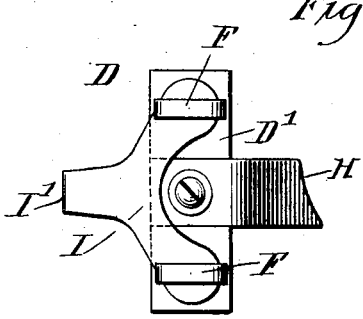
WITNESSES:
Edward Thorpe
Rev. J. Hoskin
INVENTOR
George Arnold
BY
Munn
ATTORNEYS No. 762,673.

Patented June 14, 1904.

UNITED STATES PATENT OFFICE.

GEORGE ARNOLD, OF CHICAGO, ILLINOIS, ASSIGNOR TO HIMSELF AND JAMES S. BAILEY, OF CHICAGO, ILLINOIS.

GAGE.

SPECIFICATION forming part of Letters Patent No. 762,673, dated June 14, 1904.

Application filed October 12, 1903. Serial No. 176,658. (No model.)

*To all whom it may concern:*

Be it known that I, GEORGE ARNOLD, a citizen of the United States, and a resident of Chicago, in the county of Cook and State of Illinois, have invented a new and Improved Gage, of which the following is a full, clear, and exact description.

The object of the invention is to provide a new and improved gage which is simple and durable in construction and arranged to permit its use as a single-tooth gage for marking, as a double-tooth gage for mortising work, as a cutter for forming dovetails and deep cuts, or as a stop on auger-bits to limit the depth of the holes.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement arranged as a double-tooth gage for mortising-work. Fig. 2 is an inverted plan view of the same. Fig. 3 is a side elevation of the improvement arranged as a stop on an auger, parts being in section; and Fig. 4 is a plan view of the clamping-head.

The bar A of the gage is formed on top and bottom with longitudinally-extending grooves A' and $A^2$ and with a longitudinal slot $A^3$, terminating about an inch from each end of the bar. On the forward end of the bar A is fastened a tool B, formed at the top with a scratch-pin B' and at its bottom with a cutter $B^2$ for cutting dovetails, deep cuts, and the like.

In the top groove A' of the bar A is fitted to move longitudinally a slide C, carrying at its forward end a scratch-pin C', operating in conjunction with the scratch-pin B' for making parallel scratch-lines for mortising-work, and the said slide C is held in position on the bar by a screw $C^2$, extending loosely through the slot $A^3$ for the head of the screw and its washer to engage the under side of the bar A. The screw $C^2$ serves to hold the slide C against dropping out of the groove A' and to allow longitudinal movement of the slide on the bar A. On the rear end of the slide C is an upturned flange $C^3$, adapted to be taken hold of by the operator for moving the slide forward and backward in the groove A' to bring the scratch-pin C' the desired distance from the scratch-pin B'.

The slide C is adapted to be fastened in place on the bar A after the desired adjustment is made of the slide by a clamping-head D, adapted to abut against the side of the work when using the tool as a double-tooth gage. The clamping-head D consists of transversely-extending jaws D' and $D^2$, having their opposite faces $D^3$ and $D^4$ twisted for engaging the central portion of an auger E, as plainly illustrated in Fig. 3, the said jaws also extending across the bar A, so as to engage the top and bottom thereof and the slide C to clamp the latter in position on the bar A and to fasten the head D to the bar, it being understood that the face $D^3$ of the jaw D' engages the top of the slide C for the purpose mentioned.

In the outer ends of the jaw $D^2$ are screw-rods F, turning loosely in the outer ends of the jaw $D^3$, and on the said screw-rods are coiled springs G, seated with their ends in sockets formed in the jaws D' and $D^2$. The springs G serve to press the jaws D' and $D^2$ apart when unscrewing the screw-rods F, so as to allow longitudinal movement of the clamping-head along the bar A and the slide C to bring the clamping-head to the desired position. When this has been done, the screw-rods F are screwed up, so as to move the jaws toward each other for the latter to engage the bar A or the auger E to fasten the clamping-head in position on the bar or auger.

From the jaws D' and $D^2$ extend longitudinal braces or arms H and H', having their free ends bent downward and recessed for fitting the middle portion of the auger E, as plainly indicated in Fig. 3, to assist in holding the head securely in position on the auger. The free ends of the braces H and H' are also adapted to slide in the grooves A' and $A^2$ and the free end of the brace H in addition is adapted to rest on the half-round top of the slide C.

On the top of the jaw D' is held by the screw-rods F a stop I, extending longitudinally and having a downwardly-turned foot I', adapted to abut against the face of the work when boring a hole with the auger E, so as to limit the inward movement of the auger, and thus enable the mechanic to bore a hole to the desired depth. The stop I and its foot I' extend outside the cutting edge of the auger, so that the foot I' does not interfere with the turning of the auger and positively abuts against the face of the work at the time the auger reaches the proper depth.

When the device is to be used as a single-tooth gage, then the slide C is dispensed with and the bar A and the clamping-head D only are used, and the clamping-head is adjusted the desired distance from the scratch-pin B' to bring the marking-line the desired distance from the edge of the work.

Having thus described my invention, I claim as new and desire to secure by Letters Patent—

1. A gage comprising a bar, provided at one end with a fixed scratch-pin, a slide on the said bar, carrying another scratch-pin, and a clamping-head held longitudinally adjustable on the said bar and provided with spring-pressed jaws and adjusting means for the same, to clamp the said head to the bar and to clamp the slide in position, the clamping-head being adapted to abut against the face of the work and the said adjusting means being independent of the said bar, as set forth.

2. A gage comprising a bar having longitudinal grooves and provided at one end with a scratch-pin, a clamping-head held to slide on the bar and provided with spaced jaws, means for clamping the jaws on the said bar, and braces extending from the jaws and slidingly engaging the longitudinal grooves in the bar, as set forth.

3. A gage comprising a bar having longitudinal grooves and provided at one end with a scratch-pin, a slide carrying another scratch-pin and mounted to slide on the said bar, a clamping-head held to slide on the said bar and provided with jaws, means for clamping the jaws on the bar and the said slide to the bar, and braces extending from the jaws and slidingly engaging the longitudinal grooves on the bar, one of the braces fitting the said slide, as set forth.

In testimony whereof I have signed my name to this specification in the presence of two subscribing witnesses.

GEORGE ARNOLD.

Witnesses:
 WM. DURKIN,
 JOHN MEANS.